Aug. 16, 1955 J. H. ORR 2,715,545
VEHICLE TOP WITH COMBINATION ACTUATING AND LATCHING MEANS
Filed Feb. 16, 1953 2 Sheets-Sheet 2

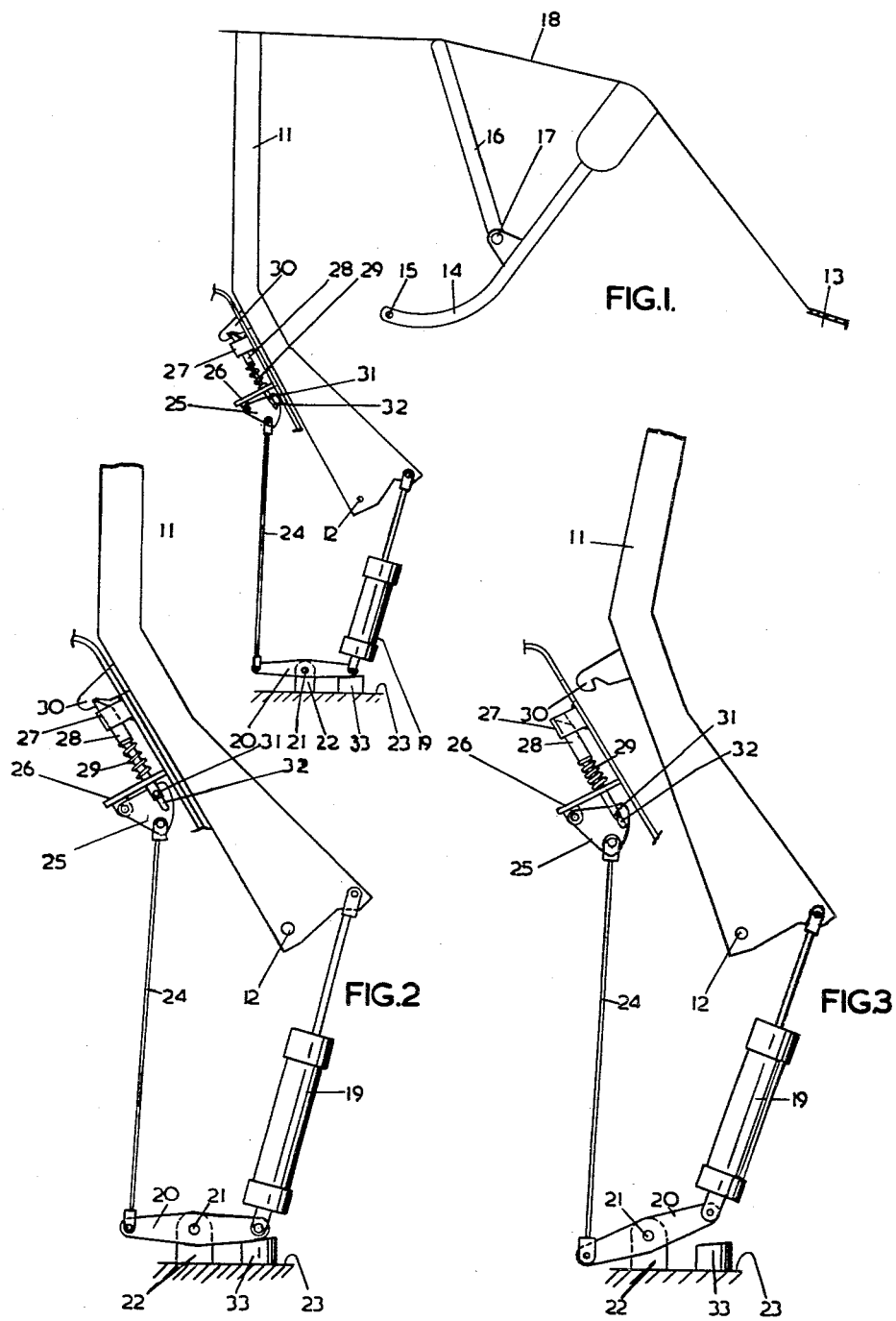

INVENTOR
J. H. ORR
BY
Hawkinney & Hawkinney
ATTYS.

United States Patent Office 2,715,545
Patented Aug. 16, 1955

2,715,545

VEHICLE TOP WITH COMBINATION ACTUATING AND LATCHING MEANS

John Hewitt Orr, Coventry, England, assignor to Carbodies Limited, Coventry, England Application February 16, 1953, Serial No. 337,189

Claims priority, application Great Britain February 15, 1952

4 Claims. (Cl. 296—117)

The invention relates to a motor-car body having a drop-head or top, either to provide a roof for the whole of the passenger space or only up to (but not over) the driver's position (i. e., a de Ville type head), of the kind which is moved (at least in the lowering direction) by a power-operated means and has a frame member which is held, by a slam-type latch, abutting a stationary part of the body when the head is in erected position, and the object of the invention is to enable the head to be easily operable into its alternative positions.

According to the invention the slam-type latch means, supported from a rigid part of the body, is connected to be moved, for releasing the head when erected, by the power-operated means just prior to the effort of the latter being applied to the head for lowering it.

In this way the head is held rigidly, when erected, by the latch means, and aero-dynamic drag on the head (due, for example, to air entering an opened window when the motor-car is moving forward) does not have to be withstood by the windscreen frame in instances where the forward edge of the head is made fast thereto, or, in the case of a head occupying only a de Ville position, by the power-operated means which, in the event that the latter is a hydraulic or pneumatic piston and cylinder arrangement, could (owing to leakage of the fluid past the piston, or to the compressibility of the pneumatic medium) be capable of undesirable movement due to the drag. Moreover the latch means does not require an independent manipulation for releasing the head when the power-operated means is operated for lowering the head, although an independently-operable handle may be provided for manually releasing the latch means.

The invention is particularly applicable (although not limited in this respect) to a de Ville type head having a main hoop of which the legs, when the head is erected, provide uprights with their feet abutting stationary parts at opposite sides of the motor-car body, the legs of the hoop being fast with members which are pivoted to the motor-car body and at least one of the said legs being fast with one coacting element of a locking means of which the other coacting element is a spring-pressed latch supported by a stationary part.

In the accompanying drawings:

Figure 1 is a side elevation, with parts removed and showing the head erected, of a portion of a motor-car body equipped with one form of operating mechanism according to the invention;

Figure 2 is an enlarged view of the operating mechanism shown in Figure 1, also showing the head in its erected position;

Figure 3 is a view corresponding to Figure 2 but showing the latch withdrawn and the head commencing its lowering movement.

Figure 4:
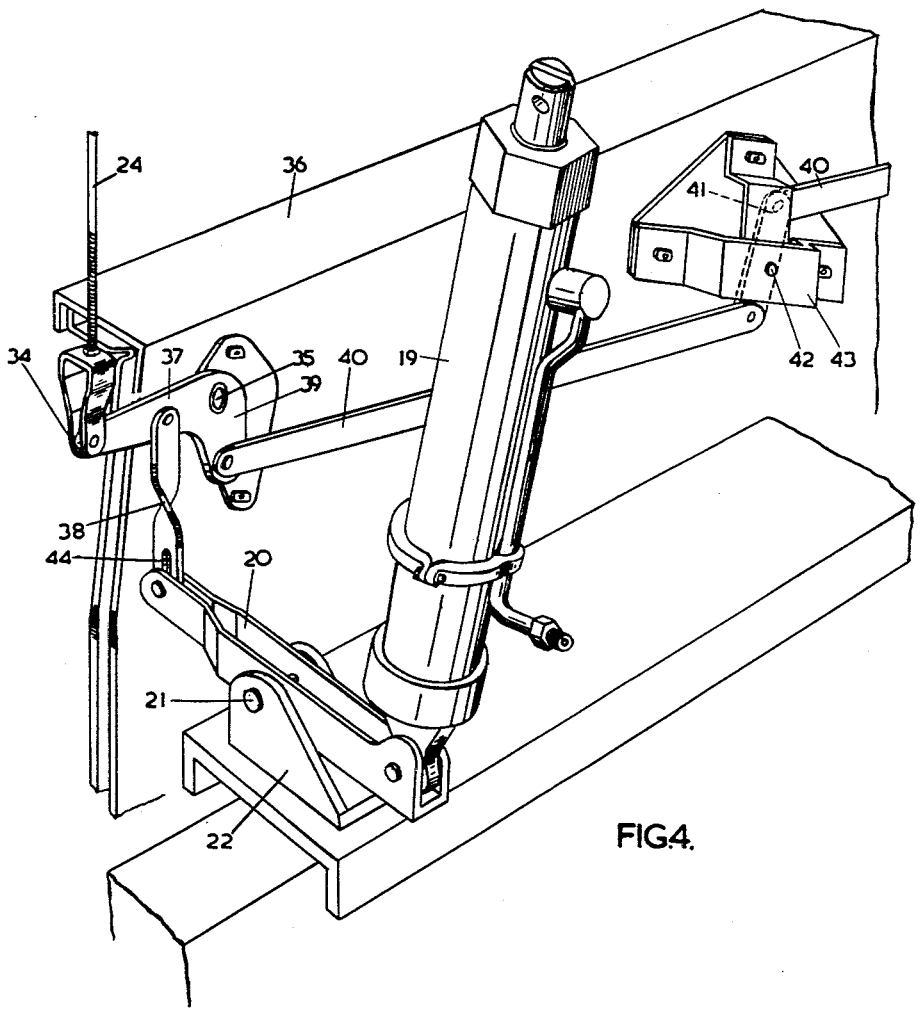
Figure 4 is a perspective view of a modified arrangement in which slam-type latches at opposite sides of the body are operated in synchronism from one hydraulic ram.

Referring to the drawings the drop-head, of which only a de Ville portion is shown, includes a forward, inverted, U-shaped hoop 11 which is pivoted at 12 to the motor-car body 13; and it also includes a supplementary hoop 14 pivoted to the body at 15, and a small hoop 16 pivoted to the hoop 14 at 17, for holding the head fabric 18 correctly stretched.

The hoop 11, laterally of its pivotal connections 12, is connected by a double-acting hydraulic ram 19 to one end of a lever 20 which is pivoted, intermediate its ends at 21, in a bracket 22 fast with the floor 23 of the motor-car body. The other end of the lever 20 is connected by a rod 24 to a latch-releasing plate 25 of which the function will be described later.

The hydraulic ram is connected in any suitable hydraulic circuit containing control means by which the direction of operation of the ram can be selected.

Such hydraulic circuits and control means are well known in themselves and form no part of the present invention.

Also fixed to the body 13 is a bracket 26 and a guide 27, both having bores in which is guided a latch 28 biassed by a spring 29 to engage a notch in a nose 30 fast with the hoop 11. The latch 28, beneath the bracket 26, has a pin 31 engaged in a slot 32 of the latch-releasing plate 25.

For lowering the head the ram 19 is operated to reduce its effective length and this pulls the rod 24 for turning the plate 25 clock-wise in Figure 1 thereby withdrawing the latch 28 from engagement with the notched nose 30. Continued contraction of the ram then lowers the drop-head.

When the ram is extended for raising the drop-head it first turns the plate 25 anti-clockwise in Figure 1 to allow the spring 29 to return the latch to the operative position with the pin 31 clear of the bottom of the slot 32. The ram then abuts a stop 33, when it can react on the hoop 11 for raising the head, and when the latter nears the erected position the nose 30 will first depress the latch, against the spring 29, and afterwards have its notch engaged thereby. These operations can best be seen in Figures 2 and 3.

In the arrangement shown in Figure 4 there is one of the slam-type latches on each side of the car body (although only one is shown) and, in the this case the rods 24 are pivoted at 34 to respective bell-crank levers which are pivoted at 35 to a cross-member 36 of the car body. The arms 37 of the bell-crank levers are connected by links 38 to the levers 20, and their other arms 39 are connected by thrust rods 40 to a reversing lever 41 which is centrally-pivoted at 42 in a bracket 43 fast with the cross-member 36. The links 38 have a pin-and-slot connection 44 with the lever 20, thus providing the lost motion. In this way one of the rams 19 is used for releasing both latches in synchronism.

It will be seen that, by the invention, not only is the head, when erected, held firmly and in a manner to relieve the power-operated means of stress, but that the head can be automatically released by the actuation of a single control for setting the power-operated means in motion for lowering the head.

What I claim as my invention and desire to secure by Letters Patent of the United States is:

1. A motor-car body with a drop-head including a forward frame member pivoted from said body, a slam-type latch means on said body and coacting with said frame member to hold said head erected, said latch means having a latch biased into engaging position, a double-acting hydraulic ram connected at one end to said frame member, a level pivoted intermediate its ends to said body, a pivotal interconnection between the other end of said ram and one arm of said lever, a rod operatively connected at one end to the latch of said latch means, the connection between said rod and said latch including a lost motion means, an operative connection between the other end of said rod and the other arm of said lever, a stop engaged by said other end of said ram when said head is erected, said ram, when actuated in the direction for lowering said head, first retracting its said other end from said stop and simultaneously acting on said rod to withdraw said latch against its bias to the disengaging position whereby to enable a continuation of the actuation of said ram to lower said head, and said ram when actuated in the direction for raising said head extending first to engage said stop for causing the said one end of said ram to act on said frame member for raising said head.

2. A motor-car body, according to claim 1, in which the operative connection between said one end of said rod and the latch of said latch means includes a plate pivoted from said body and having a pivotal interconnection with said one end of said rod, and a lateral pin fast with said latch and engaged in a slot of said plate whereby, when said head is being raised, said latch can be urged by its bias into operative position.

3. A motor-car body, according to claim 1, in which the operative connection between said other end of said rod and the said other arm of said lever includes a rocker pivoted from said body, a pivotal connection between said other end of said rod and one arm of said rocker, and a link pivoted at one end from said one arm of said rocker and having a pin-and-slot connection at its other end with said other arm of said lever.

4. A motor-car body with a drop-head including a forward frame member pivoted from said body, a pair of slam-type latch means respectively on opposite sides of said body and coacting with said frame member to hold said head erected, each said latch means having a latch biassed into engaging position, a double-acting hydraulic ram connected at one end to said frame member, a lever pivoted intermediate its ends to said body, a pivotal interconnection between the other end of said ram and one arm of said lever, rods respectively operatively interconnected at their one ends to the latches of said latch means, a pair of bell-crank levers pivoted at opposite sides of said body, a pivotal connection between the other ends of said respective rods and a respective arm of an associated bell-crank lever, a link pivoted at one end from the said one arm of one of said bell-crank levers and having a pin-and-slot connection at its other end with said other arm of said lever, a reversing lever pivoted to said body, and thrust rods interconnecting the arms of said reversing lever respectively with the other arms of said bell-crank levers, whereby both latches are operated in synchronism from said ram.

References Cited in the file of this patent

UNITED STATES PATENTS

| | | |
|---|---|---|
| 2,169,340 | Falcon | Aug. 15, 1939 |
| 2,529,458 | Orr | Nov. 7, 1950 |